Dec. 24, 1935.                G. BROULHIET                 2,025,640
                                 GYROSTAT
                         Filed Aug. 25, 1930        2 Sheets-Sheet 1

Inventor:
Georges Broulhiet
Attorneys:
Bailey & Larson

Dec. 24, 1935.   G. BROULHIET   2,025,640
GYROSTAT
Filed Aug. 25, 1930   2 Sheets-Sheet 2

Inventor
Georges Broulhiet
By Bailey & Larson
Attorneys

Patented Dec. 24, 1935

2,025,640

UNITED STATES PATENT OFFICE 2,025,640

GYROSTAT

Georges Broulhiet, Paris, France

Application August 25, 1930, Serial No. 477,750
In France September 4, 1929

11 Claims. (Cl. 74—5)

My invention relates to improvements in gyrostats provided with an oscillating system, designed to give stability to the damping and the control at a given value of an oscillatory movement for road vehicles, ships and any other movable or stationary apparatus which is subject to such dangerous movements or vibrations whether long or short.

One of said improvements consists in connecting the oscillating system to an appropriate body in order to increase its inertia. This improvement consists in regulating said movement to a predetermined value such as the rolling of a ship which it is desired to limit to a predetermined number of degrees.

According to one mode of construction the oscillating system of the gyrostat will be connected to flywheels having a multiplied speed which may eventually vary, rotated alternately in both directions by the oscillatory action of the system.

Another improvement consists in damping the movements of the oscillating system and to this effect I ultilize a centrifugal pump in which the passage of the liquid is controlled.

The oscillating movement of the gyrostat may also be braked by means of a damped pendulum connected by flexible connecting means.

These improvements may be applied together or separately or grouped according to the application in view.

The annexed drawings show diagrammatically by way of example various modes of construction of the improved devices forming the object of my invention.

Figure 1:
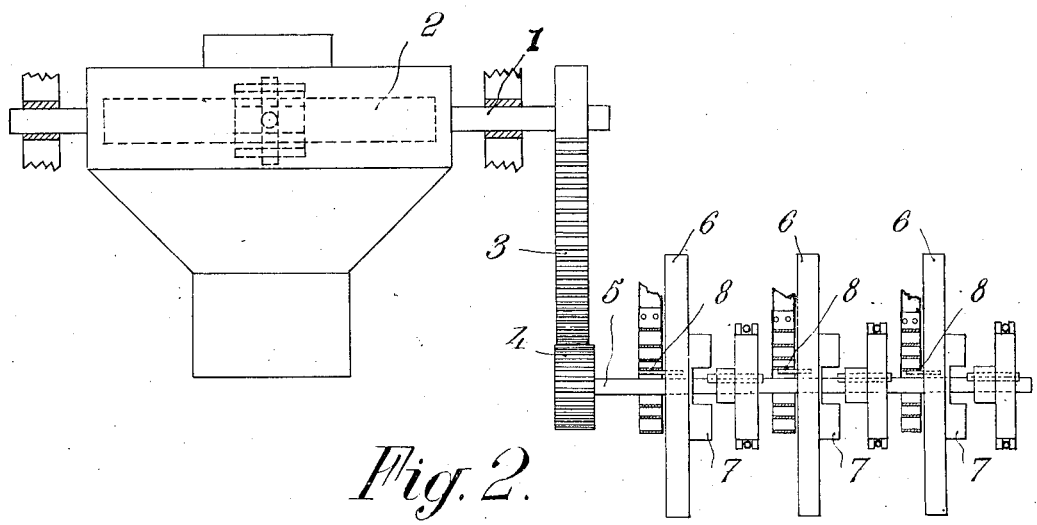
Fig. 1 is a longitudinal view of a first device designed to increase the inertia of the oscillating system.

In Fig. 1, 2 represents the precession frame of a gyrostat, I is the pivotal shaft of the said precession frame, the said shaft and frame being fixed to each other. A toothed quadrant 3 is fixedly mounted on said pivotal shaft. The teeth of the quadrant are in mesh with the teeth of a small pinion 4 secured on a shaft 5. A plurality of flywheels 6 are loosely mounted on shaft 5 and a clutch 7 is provided for each flywheel. The clutches 7 are longitudinally movable along said shaft 5 but rotatably fixed thereto. A spiral spring 8 is connected to each flywheel for returning the latter to its original position, and the other ends of the springs are connected to a fixed portion of the mechanism.

The precession frame of the gyrostat, the pivotal shaft, quadrant and flywheels form a couple designed to return an oscillating object to a position of equilibrium. The inertia of the couple may be varied by increasing or decreasing the number of flywheels connected to the shaft 5.

Figure 2:
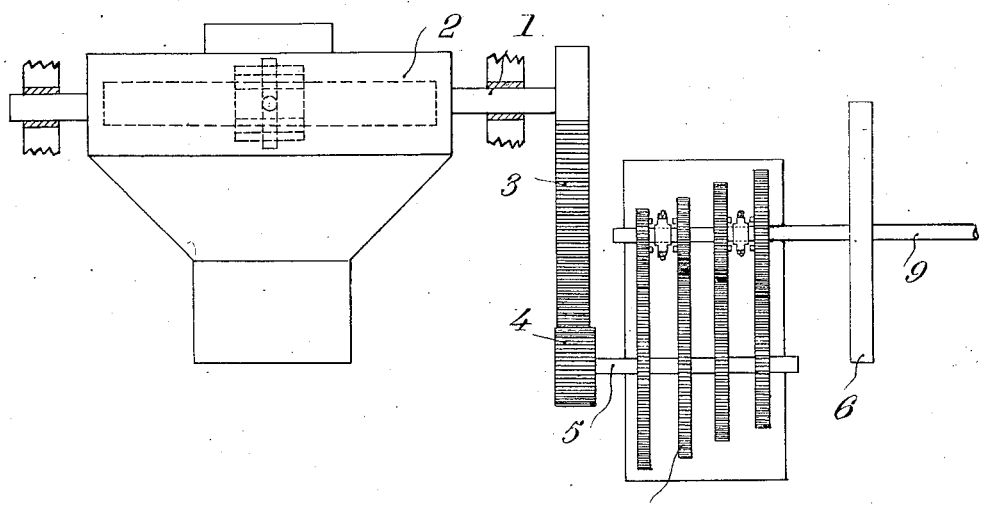
Fig. 2 shows a modified form of same.

In the mode of construction shown in Fig. 2, one or more flywheels 6 are mounted upon a shaft 9, in a manner shown in Fig. 1, the shaft being connected with the shaft 5 by means of a change speed gear 10.

Figure 3:
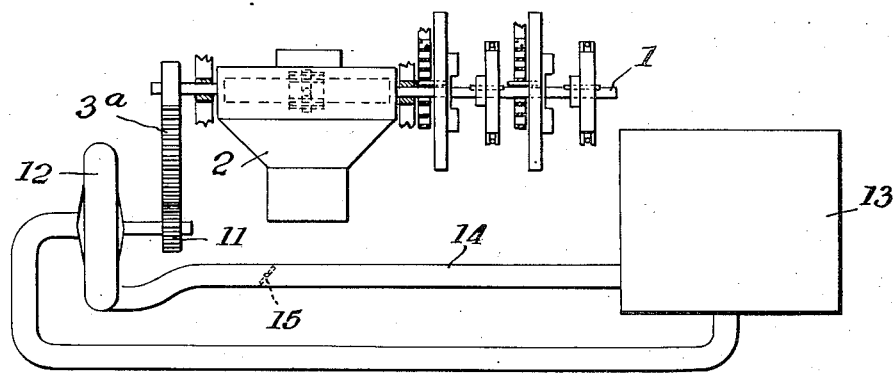
Fig. 3 represents a damping device operating by means of a centrifugal pump.

In some cases the system may comprise damping means employed alone or in combination with the above devices. In that case the pivotal shaft carries on the one end the aforesaid system and on the other end a quadrant 3ª (Fig. 3) which engages with a pinion 11 secured upon the shaft of a centrifugal pump 12 the exhaust and the inlet of which are connected through a pipe 14 provided with a valve 15 to a tank 13.

The damping effect of the pump may be varied by opening or closing the valve 15 in that when it is opened the water may be freely pumped through the line, whereas upon closing of the valve the free passage of the water is decreased. The valve may be operated manually or in any other known manner.

Figure 4:
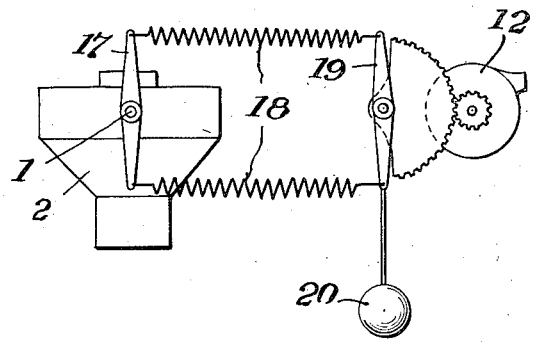
Fig. 4 is a view of a braking device.

To this end the pivotal shaft I may be provided with a rocking lever 17 (see Fig. 4) pivoted at its center connected by means of springs 18 with another similar rocking lever 19 integral with a pendulum 20 the action of which is damped in the same manner as the oscillating system above described by means of a centrifugal pump 12 actuated by the quadrant and pinion gear.

It will be understood that the improved devices according to my invention may be used together or separately or grouped in any number according to the applications in view, the object aimed at remaining however the same.

For the sake of example I will now describe a few applications of the various means already described.

Let us assume when it is desired for example that a sailing ship is to follow the swell, that is to say that its rolling is to be equal to the angle of the swell. It has been theoretically shown that it is then necessary to use simultaneously the device which allows for increasing the moment of inertia which must be in proportion with the strength of the permissible rolling and the damping device which allows of absorbing the work of the rolling.

The damping device with a secondary pendulum corresponds to the general conditions deriving from theory.

The direct braking of the gyrostat system is a particular case in which the strength of the spring becomes unlimited. In some cases the simplification cannot be applied owing to the conditions of the problem.

In another case when it is desired to bring a battleship to a complete standstill by means of a gyrostat at the moment of firing, it has been theoretically shown that the period of oscillation must be equal to that of the swell. Thence the modification of the moment of inertia may be used to obtain this result.

What I claim and desire to secure by Letters Patent of the United States is:

1. In a stabilizer for road and water vehicles in combination, a gyro-rotor, a precessional frame in which said rotor is pendulously mounted, a pivotal shaft for said frame, selectively operable means for adjustably increasing the moment of inertia of the precessional frame relative to its pivotal axis, whereby the natural oscillation frequency of the precessional frame is adjustably increased.

2. In a stabilizer for road and water vehicles in combination, a gyro-rotor, a precessional frame in which said rotor is mounted, a pivotal shaft secured to the precessional frame, a toothed quadrant keyed upon said shaft, a pinion meshing with said quadrant and keyed upon a second shaft, a plurality of flywheels loosely mounted upon said second shaft, means to clutch selectively one or more of said flywheels with the second shaft, and adjustably increase the moment of inertia of the precessional frame relatively to its axis of oscillation.

3. In a stabilizer for road and water vehicles in combination, a gyro-rotor, a precessional frame in which said rotor is mounted, a pivotal shaft secured to the precessional frame, a toothed quadrant keyed upon said shaft, a pinion meshing with said quadrant and keyed upon a second shaft, a flywheel keyed upon a third shaft, and a change speed gear between the second and the third shafts for adjustably increasing the moment of inertia of the precessional frame relatively to its axis of oscillation.

4. In a stabilizer for road and water vehicles, in combination, a gyro-rotor, a precessional frame in which said rotor is pendulously mounted, means to increase the moment of inertia of the precessional frame relatively to its axis of oscillation, means for selectively varying the pendular return torque of the precessional frame in such a manner as to vary the natural oscillation frequency of the precessional frame.

5. In a stabilizer for road and water vehicles in combination, a gyro-rotor, a precessional frame in which said rotor is mounted, a pivotal shaft secured to the precessional frame, a toothed quadrant keyed upon said shaft, a pinion meshing with said quadrant and keyed upon a second shaft, a plurality of flywheels loosely mounted upon said second shaft, means to clutch the desired member of said flywheels with the second shaft, a spiral spring provided for each flywheel in order to produce the simultaneous variation of the moment of inertia of the precessional frame and of the pendular return torque of the precessional frame.

6. In a stabilizer for road and water vehicles in combination, a gyro-rotor, a precessional frame in which said rotor is mounted, means to adjustably increase the moment of inertia of the precessional frame, a pivotal shaft secured to the precessional frame, a damping device connected to said pivotal shaft in order to absorb the excess of kinetic energy stored up in the oscillating masses.

7. In a stabilizer for road and water vehicles, in combination, a gyro-rotor, a precessional frame in which said rotor is mounted, a pivotal shaft secured to the precessional frame, a rocking lever keyed upon said shaft and connected through resilient means with another rocking lever keyed upon a second shaft, a pendulum keyed upon said second shaft, a damping device connected with said second shaft, means to vary the action of said damping device in order to absorb the excess of kinetic energy stored up in the oscillating masses.

8. In a stabilizer for road and water vehicles, in combination, a gyro-rotor, a precessional frame in which said rotor is mounted, a pivotal shaft secured to the precessional frame, a second shaft, means whereby turning of said first shaft turns said second shaft, a plurality of flywheels loosely mounted upon said second shaft, and means to clutch selectively one or more of said flywheels with the second shaft to adjust the moment of inertia of the precessional frame relative to its axis of oscillation.

9. In a stabilizer for road and water vehicles, in combination, a gyro-rotor, a precessional frame in which said rotor is mounted, a pivotal shaft secured to the precessional frame, a second shaft, means connecting said shafts whereby turning of said first shaft turns said second shaft, means to clutch any desired number of said flywheels with the second shaft, and a spiral spring associated with each flywheel, whereby to produce simultaneous variation of the moment of inertia of the precessional frame and of the pendular return torque of the precessional frame.

10. In a stabilizer for road and water vehicles, in combination, a gyro-rotor, a pivotal precessional frame in which said rotor is pendulously mounted, and means for positively adjusting the moment of inertia of the precessional frame relative to its pivotal axis, whereby the natural oscillation frequency of the precessional frame is adjustably increased.

11. In a stabilizer for road and water vehicles, in combination, a gyro-rotor, a precessional frame in which said rotor is mounted, a pivotal shaft secured to the precessional frame, a second shaft, means connecting said shafts whereby turning of said first shaft turns said second shaft, a pump connected with said second shaft, receptacles containing liquid connected to said pump, and means to vary the flow of liquid through said pump in order to cause the energy taken up by the shaft of the pump to vary.

GEORGES BROULHIET.